(12) United States Patent
Loeper (10) Patent No.: US 7,562,040 B2
(45) Date of Patent: Jul. 14, 2009

(54) METHOD, SYSTEM AND COMPUTER PROGRAM FOR AUDITING FINANCIAL PLANS

(76) Inventor: David B. Loeper, 207 Michaux Crossing La., Midlothian, VA (US) 23113

( * ) Notice: Subject to any disclaimer, the term of this patent is extended or adjusted under 35 U.S.C. 154(b) by 1425 days.

(21) Appl. No.: 09/916,358

(22) Filed: Jul. 27, 2001

(65) Prior Publication Data

US 2002/0082965 A1   Jun. 27, 2002

Related U.S. Application Data

(63) Continuation-in-part of application No. 09/434,645, filed on Nov. 5, 1999, now abandoned.

(60) Provisional application No. 60/107,245, filed on Nov. 5, 1998, provisional application No. 60/221,010, filed on Jul. 27, 2000.

(51) Int. Cl.
*G06Q 40/00* (2006.01)
(52) U.S. Cl. .................... 705/36 R; 705/35
(58) Field of Classification Search ............ 705/36 R, 705/35, 38, 37, 36 T, 39, 10; 706/906
See application file for complete search history.

(56) References Cited

U.S. PATENT DOCUMENTS

| | | | |
|---|---|---|---|
| 4,953,085 A | 8/1990 | Atkins | 364/408 |
| 5,193,056 A | 3/1993 | Boes | 364/408 |
| 5,245,535 A | 9/1993 | Weiss et al. | |
| 5,291,398 A | 3/1994 | Hagan | 364/408 |
| 5,615,109 A | 3/1997 | Eder | 395/208 |
| 5,774,881 A | 6/1998 | Friend | |
| 5,802,501 A | 9/1998 | Graff | |

(Continued)

FOREIGN PATENT DOCUMENTS

WO   WO 96/18162   6/1996

OTHER PUBLICATIONS

Hendricks D., Evaluation of Value-at-Risk Models Using Historical Data, FRBNY Economic Policy Review, Apr. 1996, pp. 39-70.*

(Continued)

*Primary Examiner*—Kelly Campen
(74) *Attorney, Agent, or Firm*—Thomas, Raring & Teague, P.C.

(57) ABSTRACT

A method for evaluating a financial plan, including a predetermined initial values of investments and one or more contribution or withdrawal amounts corresponding to selected times after the commencement of the financial plan, includes the steps of calculating the change in a predetermined initial value of an investment over a time interval based on changes in value over a randomly-selected first historical time interval to obtain a changed investment value, updating the changed investment value based on the selected contribution or withdrawal amount corresponding to the length of the time interval in accordance with the financial plan to obtain a further changed investment value, calculating the change in the further changed investment value over a second time interval based on changes over a randomly-selected second historical time interval to obtain a further investment value, repeating the steps of calculating, updating and again calculating with respect to a randomly-selected third historical time interval and a randomly-selected fourth historical time interval, respectively.

26 Claims, 10 Drawing Sheets

U.S. PATENT DOCUMENTS

| | | | |
|---|---|---|---|
| 5,812,988 A * | 9/1998 | Sandretto | 705/36 R |
| 5,819,263 A | 10/1998 | Bromley et al. | 707/3 |
| 5,852,811 A | 12/1998 | Atkins | 705/36 |
| 5,864,828 A | 1/1999 | Atkins | 705/36 |
| 5,875,435 A | 2/1999 | Brown | 705/30 |
| 5,875,437 A | 2/1999 | Atkins | 705/40 |
| 5,878,405 A | 3/1999 | Grant et al. | 705/39 |
| 5,884,283 A | 3/1999 | Manos | 705/30 |
| 5,884,285 A | 3/1999 | Atkins | 705/36 |
| 5,884,287 A | 3/1999 | Edesess | |
| 5,903,879 A | 5/1999 | Mitchell | 705/38 |
| 5,911,135 A | 6/1999 | Atkins | 705/36 |
| 5,911,136 A | 6/1999 | Atkins | 705/36 |
| 5,918,217 A | 6/1999 | Maggioncalda et al. | 705/36 |
| 5,933,815 A | 8/1999 | Golden | 705/35 |
| 5,946,667 A | 8/1999 | Tull, Jr. et al. | 705/36 |
| 5,987,433 A | 11/1999 | Crapo | 705/36 |
| 5,999,918 A | 12/1999 | Williams et al. | |
| 6,012,043 A | 1/2000 | Albright et al. | 705/36 |
| 6,012,044 A | 1/2000 | Maggioncalda et al. | 705/36 |
| 6,021,394 A | 2/2000 | Takahashi | |
| 6,021,397 A | 2/2000 | Jones et al. | |
| 6,026,381 A | 2/2000 | Barton, III et al. | 705/35 |
| 6,058,376 A | 5/2000 | Crockett | 705/35 |
| 6,078,904 A | 6/2000 | Rebane | 705/36 |
| 6,085,175 A | 7/2000 | Gugel et al. | |
| 6,154,732 A | 11/2000 | Tarbox | |
| 6,253,192 B1 | 6/2001 | Corlett et al. | |
| 6,275,814 B1 * | 8/2001 | Giansante et al. | 705/36 R |
| 6,298,334 B1 | 10/2001 | Burfield et al. | 705/36 |
| 6,340,542 B1 | 1/2002 | Inoue et al. | 430/5 |
| 6,430,542 B1 | 8/2002 | Moran | |
| 6,456,982 B1 * | 9/2002 | Pilipovic | 705/36 R |
| 6,564,191 B1 | 5/2003 | Reddy | 705/36 |
| 6,772,136 B2 | 8/2004 | Kant et al. | |
| 6,799,167 B1 * | 9/2004 | Gullen et al. | 705/36 R |
| 6,850,923 B1 | 2/2005 | Nakisa et al. | |
| 6,907,404 B1 * | 6/2005 | Li | 705/36 R |
| 7,016,872 B1 * | 3/2006 | Bettis et al. | 705/36 R |
| 2001/0014873 A1 | 8/2001 | Henderson et al. | 705/35 |
| 2002/0082965 A1 * | 6/2002 | Loeper | 705/36 |
| 2002/0091604 A1 | 7/2002 | Loeper | 705/36 |
| 2002/0138386 A1 | 9/2002 | Maggioncalda et al. | 705/36 |
| 2002/0143680 A1 | 10/2002 | Walters et al. | |
| 2002/0147671 A1 | 10/2002 | Sloan et al. | |
| 2003/0028464 A1 | 2/2003 | Kosinski | |
| 2003/0088489 A1 | 5/2003 | Peters et al. | |
| 2003/0097324 A1 | 5/2003 | Speckman | |
| 2003/0144936 A1 | 7/2003 | Sloan et al. | |
| 2003/0208427 A1 | 11/2003 | Peters et al. | |
| 2003/0212622 A1 | 11/2003 | Wallman | |
| 2004/0133497 A1 | 7/2004 | Spear | 705/36 |
| 2004/0172357 A1 | 9/2004 | Padgette | |
| 2004/0267651 A1 | 12/2004 | Jenson et al. | |
| 2005/0154662 A1 | 7/2005 | Langenwalter | |
| 2006/0010053 A1 | 1/2006 | Farrow | |

OTHER PUBLICATIONS

Bengen, W., Determining Withdrawal Rates Using Historical Data, Oct. 1994, pp. 171-180.*

Li, Y., Market Risk Measurement: A Historical Simulation Approach, web printout, undated, 4 pages.*

Bierwirth, L., Investing for Retirement: Using the Past to Model the Future, Jnl. Of Financial Planning, v7n1, Jna. 1994, 6 pages.*

Ellen Jovin, "New Software, New Sophistication", Financial Planning, pp. 1-6, 1998.

Planners Must Tailor Mutual Fund Mix to Suit Client:, Financial Services Week, Aug. 1990, pp. 23, ISSN: 0895-8440.

Larry Bierwirth, "Investing in retirement: Using the Past to Model the Future", Journal of Financial Planning, v7n1, Jan. 1994, 6 pages.

D. Haddock, H. Brock, College Accounting, Seventh Edition, Glencoe Division Mcmillan/Mcgraw-Hill, 1994, pp. 100, 161, 145-153, 453, 640-669, 736-741, 757-761, 1092-1095.

Kenneth et al., "Helping Employees Invest Wisely", HR Magazine v38n 11, pp. 77-82, Nov. 1993, Dialog File 15, Accession No. 00794493.

USPTO Office Action; U.S. Appl. No. 11/014,378; mailing date May 23, 2007.

USPTO Office Action; U.S. Appl. No. 11/014,378; mailing date Oct. 9, 2007.

USPTO Office Action; U.S. Appl. No. 11/014,378; mailing date Jun. 17, 2008.

USPTO Office Action; U.S. Appl. No. 11/423,165; mailing Aug. 29, 2008.

USPTO Office Action; U.S. Appl. No. 11/423,165; mailing date Mar. 3, 2009.

USPTO Office Action; U.S. Appl. No. 11/014,378; mailing date Nov. 25, 2008.

USPTO Office Action; U.S. Appl. No. 11/014,378 date of mailing Apr. 6, 2009.

India Search Report; Application No. 1853/DELNP/2006; 2 pages.

* cited by examiner

Total Plan Values (99% Probability)

*results shown in today's dollars*

99.00% Probability
Return: 8.47%
Market Period: 1929-1955,1929-1954

| Year | Age | Net Cash(Need) Surplus | Yield | Appreciation | Taxes | Ending Value |
|---|---|---|---|---|---|---|
| 0 | 37 | - | - | - | - | $200,000 |
| 1 | 38 | $16,250 | $2,874 | $-47,697 | $-443 | $164,686 |
| 2 | 39 | $16,250 | $2,366 | $-41,569 | $-350 | $136,113 |
| 3 | 40 | $16,250 | $1,956 | $-51,699 | $-276 | $97,906 |
| 4 | 41 | $16,250 | $1,407 | $-4,834 | $-188 | $107,216 |
| 5 | 42 | $16,250 | $1,541 | $80,398 | $-196 | $201,613 |
| 6 | 43 | $16,250 | $2,897 | $16,969 | $-361 | $231,022 |
| 7 | 44 | $16,250 | $3,320 | $76,613 | $-2,617 | $317,385 |
| 8 | 45 | $16,250 | $4,560 | $119,588 | $-12,972 | $435,095 |
| 9 | 46 | $16,250 | $6,252 | $-163,195 | $-706 | $280,550 |
| 10 | 47 | $16,250 | $4,031 | $67,086 | $-449 | $358,823 |
| 11 | 48 | $16,250 | $5,156 | $-3,140 | $-569 | $365,595 |
| 12 | 49 | $16,250 | $5,253 | $-24,321 | $-575 | $351,080 |
| 13 | 50 | $16,250 | $5,045 | $-32,790 | $-547 | $328,339 |
| 14 | 51 | $16,250 | $4,718 | $79,002 | $-507 | $417,765 |
| 15 | 52 | $8,250 | $6,003 | $180,366 | $-11,442 | $588,534 |
| 16 | 53 | $8,250 | $8,457 | $161,183 | $-14,848 | $734,193 |
| 17 | 54 | $8,250 | $10,550 | $310,958 | $-26,237 | $1,016,089 |
| 18 | 55 | $8,250 | $14,600 | $-92,140 | $-1,258 | $915,706 |
| 19 | 56 | $6,250 | $13,158 | $8,499 | $-1,107 | $915,653 |
| 20 | 57 | $6,250 | $13,157 | $2,624 | $-1,075 | $909,758 |
| 21 | 58 | $16,250 | $13,072 | $129,745 | $-4,424 | $1,037,431 |
| 22 | 59 | $16,250 | $14,907 | $270,123 | $-19,615 | $1,288,406 |
| 23 | 60 | $16,250 | $18,513 | $137,615 | $-10,394 | $1,412,390 |
| 24 | 61 | $16,250 | $20,295 | $101,209 | $-7,984 | $1,500,549 |
| 25 | 62 | $16,250 | $21,561 | $-57,325 | $-1,567 | $1,435,290 |
| 26 | 63 | $16,250 | $20,624 | $621,538 | $-37,268 | $2,014,156 |
| 27 | 64 | $16,250 | $28,941 | $378,511 | $-24,531 | $2,354,190 |
| 28 | 65 | $-32,955 | $33,827 | $-561,434 | $-2,237 | $1,723,782 |
| 29 | 66 | $-49,205 | $24,769 | $-435,106 | $-1,471 | $1,213,995 |
| 30 | 67 | $-49,205 | $17,444 | $-461,101 | $-860 | $686,347 |
| 31 | 68 | $-49,205 | $9,862 | $-33,890 | $-305 | $594,252 |
| 32 | 69 | $-49,205 | $8,539 | $445,611 | $-8,608 | $974,713 |

FIG. 3A

| Year | Age | Net Cash(Need) Surplus | Yield | Appreciation | Taxes | Ending Value |
|---|---|---|---|---|---|---|
| 33 | 70 | $-49,205 | $14,006 | $82,039 | $-21,263 | $973,334 |
| 34 | 71 | $-49,205 | $13,988 | $322,783 | $-21,263 | $1,212,719 |
| 35 | 72 | $-49,205 | $17,425 | $456,943 | $-21,263 | $1,582,731 |
| 36 | 73 | $-49,205 | $22,742 | $-593,649 | $-21,263 | $896,692 |
| 37 | 74 | $-49,205 | $12,885 | $214,418 | $-21,263 | $1,028,843 |
| 38 | 75 | $-49,205 | $14,783 | $-9,004 | $-21,263 | $935,622 |
| 39 | 76 | $-49,205 | $13,444 | $-62,243 | $-21,263 | $790,538 |
| 40 | 77 | $-43,226 | $11,359 | $-73,835 | $-18,679 | $644,391 |
| 41 | 78 | $-43,226 | $9,259 | $155,048 | $-18,679 | $729,284 |
| 42 | 79 | $-43,226 | $10,479 | $314,862 | $-18,679 | $972,737 |
| 43 | 80 | $-43,226 | $13,977 | $266,406 | $-18,679 | $1,164,143 |
| 44 | 81 | $-43,226 | $16,727 | $493,058 | $-20,721 | $1,577,333 |
| 45 | 82 | $-43,226 | $22,665 | $-143,034 | $-29,414 | $1,339,641 |
| 46 | 83 | $-43,226 | $19,249 | $12,434 | $-25,757 | $1,264,582 |
| 47 | 84 | $-43,226 | $18,171 | $3,624 | $-25,375 | $1,182,203 |
| 48 | 85 | $-43,226 | $16,987 | $168,600 | $-24,627 | $1,266,763 |
| 49 | 86 | $-43,226 | $18,202 | $329,836 | $-27,494 | $1,508,444 |
| 50 | 87 | $-43,226 | $21,675 | $161,117 | $-34,113 | $1,571,220 |
| 51 | 88 | $-43,226 | $22,577 | $112,591 | $-36,501 | $1,582,157 |
| 52 | 89 | $-43,226 | $22,734 | $-60,443 | $-37,999 | $1,418,399 |
| 53 | 90 | $-43,226 | $20,381 | $614,224 | $-37,320 | $1,932,404 |
| | | $-792,620 | $703,365 | $3,943,174 | $-718,861 | |

FIG. 3B

Probability Analysis

*results shown in today's dollars*

| Probability | Ending Value | Market Period | Return |
|---|---|---|---|
| 3% | $52,004,745 | 1942-1968,1942-1967 | 15.46% |
| 6% | $34,054,657 | 1943-1969,1943-1968 | 14.52% |
| 9% | $28,818,996 | 1941-1967,1941-1966 | 13.94% |
| 12% | $26,660,365 | 1971-1997,1971-1996 | 13.48% |
| 15% | $25,046,329 | 1932-1958,1932-1957 | 13.64% |
| 18% | $20,347,210 | 1938-1964,1938-1963 | 13.05% |
| 21% | $19,054,140 | 1939-1965,1939-1964 | 12.81% |
| 24% | $18,020,177 | 1970-1996,1970-1995 | 12.54% |
| 27% | $16,159,715 | 1934-1960,1934-1959 | 12.55% |
| 30% | $15,264,849 | 1967-1993,1967-1992 | 12.37% |
| 33% | $14,411,675 | 1944-1970,1944-1969 | 12.52% |
| 36% | $13,777,468 | 1958-1984,1958-1983 | 12.36% |
| 39% | $11,727,696 | 1961-1987,1961-1986 | 11.91% |
| 42% | $11,029,867 | 1964-1990,1964-1989 | 11.79% |
| 45% | $10,931,907 | 1966-1992,1966-1991 | 11.56% |
| 48% | $10,592,221 | 1954-1980,1954-1979 | 11.80% |
| 51% | $10,466,048 | 1965-1991,1965-1990 | 11.55% |
| 54% | $9,900,836 | 1945-1971,1945-1970 | 11.63% |
| 57% | $9,624,709 | 1957-1983,1957-1982 | 11.43% |
| 60% | $9,510,606 | 1969-1995,1969-1994 | 11.04% |
| 63% | $9,246,313 | 1968-1994,1968-1993 | 11.18% |
| 66% | $8,652,208 | 1931-1957,1931-1956 | 11.08% |
| 69% | $6,904,472 | 1955-1981,1955-1980 | 10.86% |
| 72% | $6,587,768 | 1956-1982,1956-1981 | 10.65% |
| 75% | $6,372,427 | 1953-1979,1953-1978 | 10.66% |
| 78% | $6,174,089 | 1947-1973,1947-1972 | 10.69% |
| 81% | $6,159,547 | 1950-1976,1950-1975 | 10.64% |
| n/a | $5,844,900 | Expected Return | 10.50% |
| 84% | $5,673,670 | 1930-1956,1930-1955 | 10.02% |
| 87% | $5,185,327 | 1952-1978,1952-1977 | 10.29% |
| 90% | $4,272,704 | 1949-1975,1949-1974 | 9.98% |
| 93% | $2,850,551 | 1928-1954,1928-1953 | 8.50% |
| 96% | $2,339,247 | 1926-1952,1926-1951 | 8.80% |
| 99% | $1,932,404 | 1929-1955,1929-1954 | 8.47% |

METHOD, SYSTEM AND COMPUTER PROGRAM FOR AUDITING FINANCIAL PLANS

RELATED APPLICATIONS

This application claims priority from U.S. Provisional Patent Application No. 60/221,010, filed Jul. 27, 2000, which application is hereby incorporated by reference, and is a continuation-in-part of copending U.S. patent application Ser. No. 09/434,645, filed Nov. 5, 1999.

FIELD OF THE INVENTION

This invention relates to computer programs and related methods and systems for financial planning for individuals.

BACKGROUND OF THE INVENTION

Financial plans are essential to the plans for retirement, saving for major expenses, such as children's education, for most individuals. If too little is saved, or the wrong investments are made, individuals will not be able to maintain their lifestyles in retirement, may not be able to send their children to desired schools, or may find themselves outliving their savings. On the other hand, if more sums than are needed are set aside for future needs, individuals may find themselves unnecessarily denying themselves and their families even minor luxuries, such as vacations and larger homes. Professional financial planners and individuals have a variety of ways of creating financial plans. The financial services industry has adopted standardized means of projecting out individual financial plans. There currently exists today no program or mechanism that allows an individual to have an accurate perception of what would have happened to their financial plan historically. In lieu of actually doing that, which is also a little bit insufficient, the financial services industry has adopted two standard means, either a simple annualized return or a statistical estimation of future values. The fundamental flaw with those standard means is: 1) they use either an assumed rate of investment return over the whole period of time, and as can be proven mathematically, lacks any relation to what the values will be in the future even if those annualized returns are received, or 2) they try to statistically calculate to come out with a forecast of statistical probability of the distribution of outcomes; by the very nature of the statistical estimation, those do not really relate to actual historical experience. In either case, the fundamental problem in any financial plan done with any of these standardized tools, either using simple annualized return as a means of estimating future values or a statistical estimation of future values, that the plans do not accurately predict the future wealth of the individual using the financial plan. For example, existing prior art tools help the individual figure out a risk tolerance, and then request the user to furnish a return expectation is or determine what the return expectations should be for the risk tolerance. These prior art tools then advise the user to expect a certain return, or a certain outcome based on a certain return, allowing for projected cash flows.

The lack of accuracy in prediction, as noted above, causes great problems for the individual. The individual may fail to meet his financial goals or forego opportunities in trying to meet those goals. A financial plan may direct an individual to save more money then she needs to, or retire later than he or she needs to. A financial plan may advise an individual that he may retire earlier than he should, or withdraw more money than he should from investments. All of this advice results from the estimation errors made through either of the current industry norms.

Financial plans are generally reviewed and revisited once every few years. The financial plan and forecasting tools are not meant to help the individual client make decisions on a daily basis about the implications of making an asset allocation decision or making purchasing decisions or retirement decisions. These decisions tend to be very long term in nature and updated fairly infrequently. Even if the tools were accurate, predictions may be made after investment, spending or retirement decisions have already been made. Their inherent nature is such that they are not updated on a regular basis. Such plans provide little support for investors to make investment decisions.

For example, an investor feels wealthy because he has received some great market returns. His plan called for saving $20,000 a year, and he intends to continue to do so. His current plan said he was supposed to have $2 million at a given time, and because of great market return, he now has $2.5 million. He then decides to make a major purchase using a portion of the additional $500,000. He fails to rerun his financial plan. He does not know how making that purchase decision will affect his likelihood of achieving his long-term goals.

An object of the invention is to provide a method for evaluating financial plans to determine the likelihood that an investor will meet the investor's financial goals.

An advantage of the present invention is that such a method is provided. Additional objects and advantages will become evident from the detailed description of a preferred embodiment which follows.

SUMMARY OF THE INVENTION

A method for evaluating a financial plan, including predetermined initial values of investments and one or more contribution or withdrawal amounts corresponding to selected times after the commencement of the financial plan, includes the steps of calculating the change in a predetermined initial value of an investment over a time interval based on changes in value over a randomly-selected first historical time interval to obtain a changed investment value, updating the changed investment value based on the selected contribution or withdrawal amount corresponding to the length of the time interval in accordance with the financial plan to obtain a further changed investment value, calculating the change in the further changed investment value over a second time interval based on changes over a randomly-selected second historical time interval to obtain a further investment value, repeating the steps of calculating, updating and again calculating with respect to a randomly-selected third historical time interval and a randomly-selected fourth historical time interval, respectively. The method may include presenting the result of the calculations as a report to an individual. The method is preferably implemented by suitable computer software. Investments may be categorized in more than one asset category, and distinct historical data employed in calculations for each asset category. The results of the calculation may be compared to a selected wealth goal. After each calculation relative to historical data, an adjustment of the investment value to simulate tax effects may be made. The use of randomly-selected historical time intervals provides a very large number of simulated historical periods against which to evaluate a financial plan.

A system for evaluating financial plans, including predetermined initial values of investments and one or more contribution or withdrawal amounts corresponding to selected times after the commencement of the financial plan, includes a computer programmed to calculate the change in a predetermined initial value of an investment over a time interval based on changes in value over a randomly-selected first historical time interval to obtain a changed investment value; to update the changed investment value based on a contribution or withdrawal amount set in the financial plan for a time corresponding to the time interval to obtain a further changed investment value; to calculate the change in the further changed investment value over a second time interval based on changes over a randomly-selected second historical time interval to obtain a further investment value, to further calculate, update and again calculate with respect to a randomly-selected third historical time interval and a randomly-selected fourth historical time interval.

A storage medium has stored therein instructions, wherein the instructions, when executed by a processor, cause the processor to perform the steps of:

calculating the change in a predetermined initial value of an investment over a time interval based on changes in value over a randomly-selected first historical time interval to obtain a changed investment value;

updating the changed investment value based on a contribution amount or a withdrawal amount set in a financial plan and corresponding to the duration of the time interval, to obtain a further changed investment value; and     calculating the change in the further changed investment value over a second time interval based on changes over a randomly-selected second historical time interval to obtain a further investment value, and     repeating said steps of calculating, updating and again calculating with respect to a randomly-selected third historical time interval and a randomly-selected fourth historical time interval, respectively.

BRIEF DESCRIPTION OF THE FIGURES

FIG. 3A and 3B are a sample chart of a result of a method of the invention.

FIG. 4 is a sample chart showing another result of a method of the invention.

DESCRIPTION OF THE INVENTION

Figures 1, 1A:
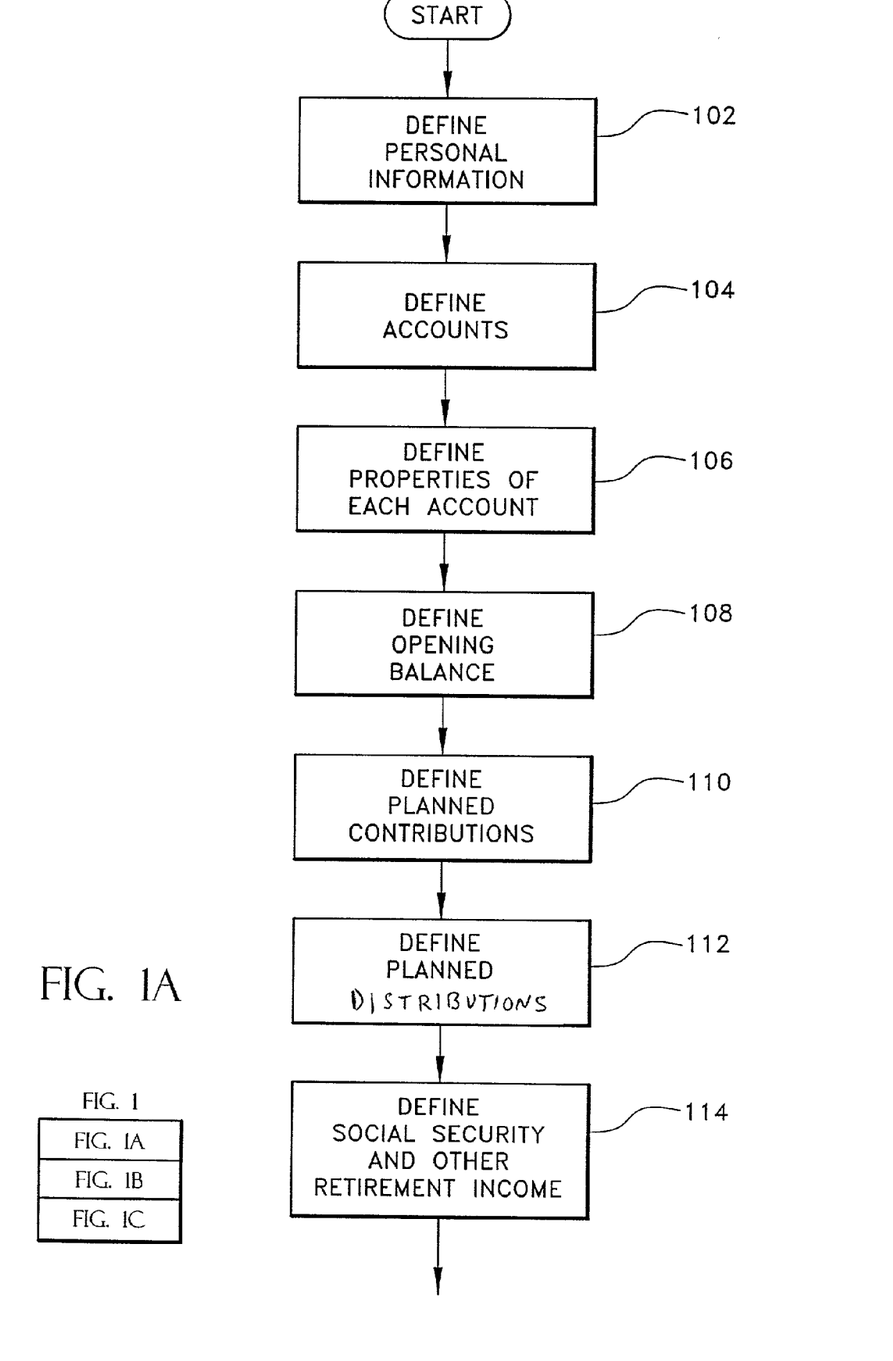
FIGS. 1A, 1B and 1C are a flow chart illustrating the steps in a method according to the invention.
Figure 1B:
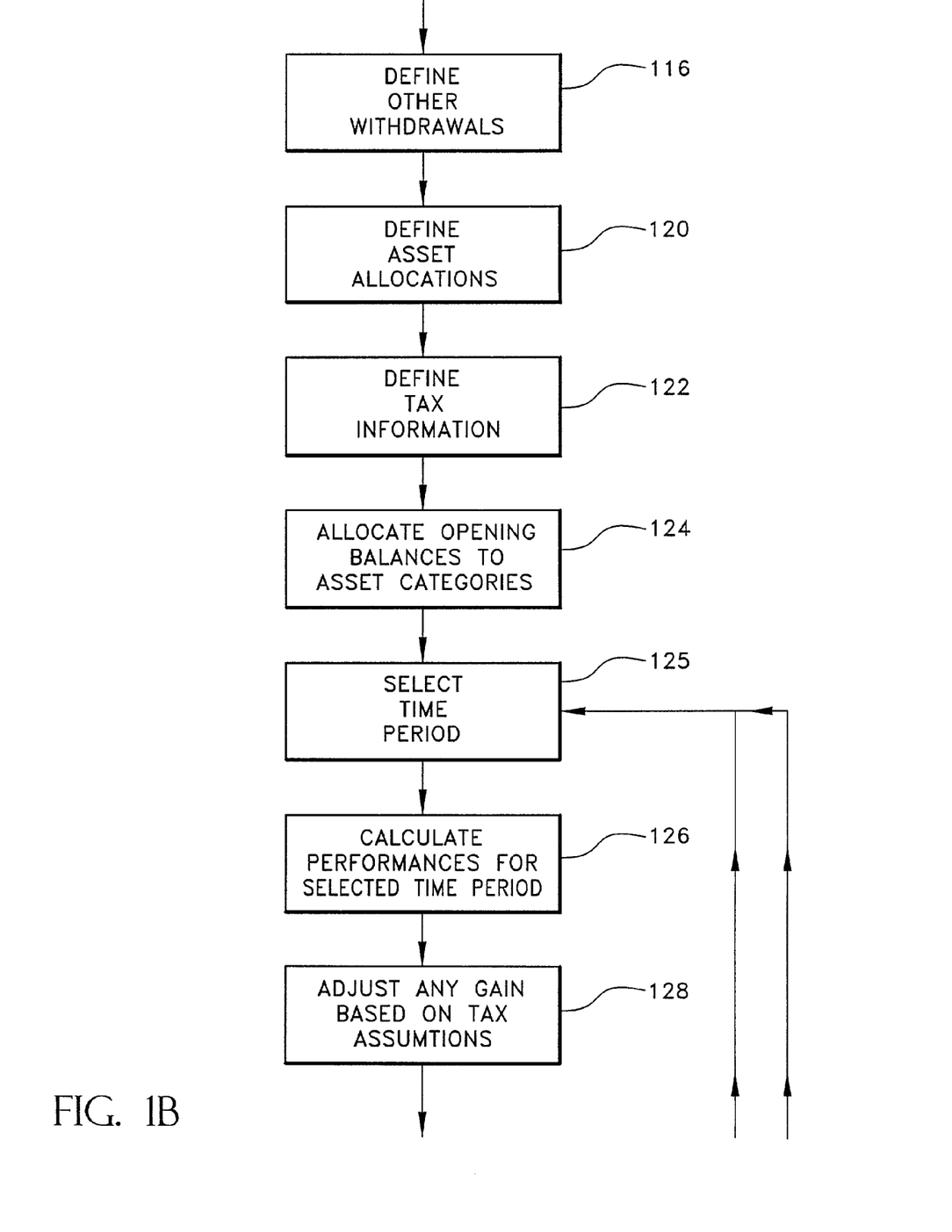
Figure 1C:
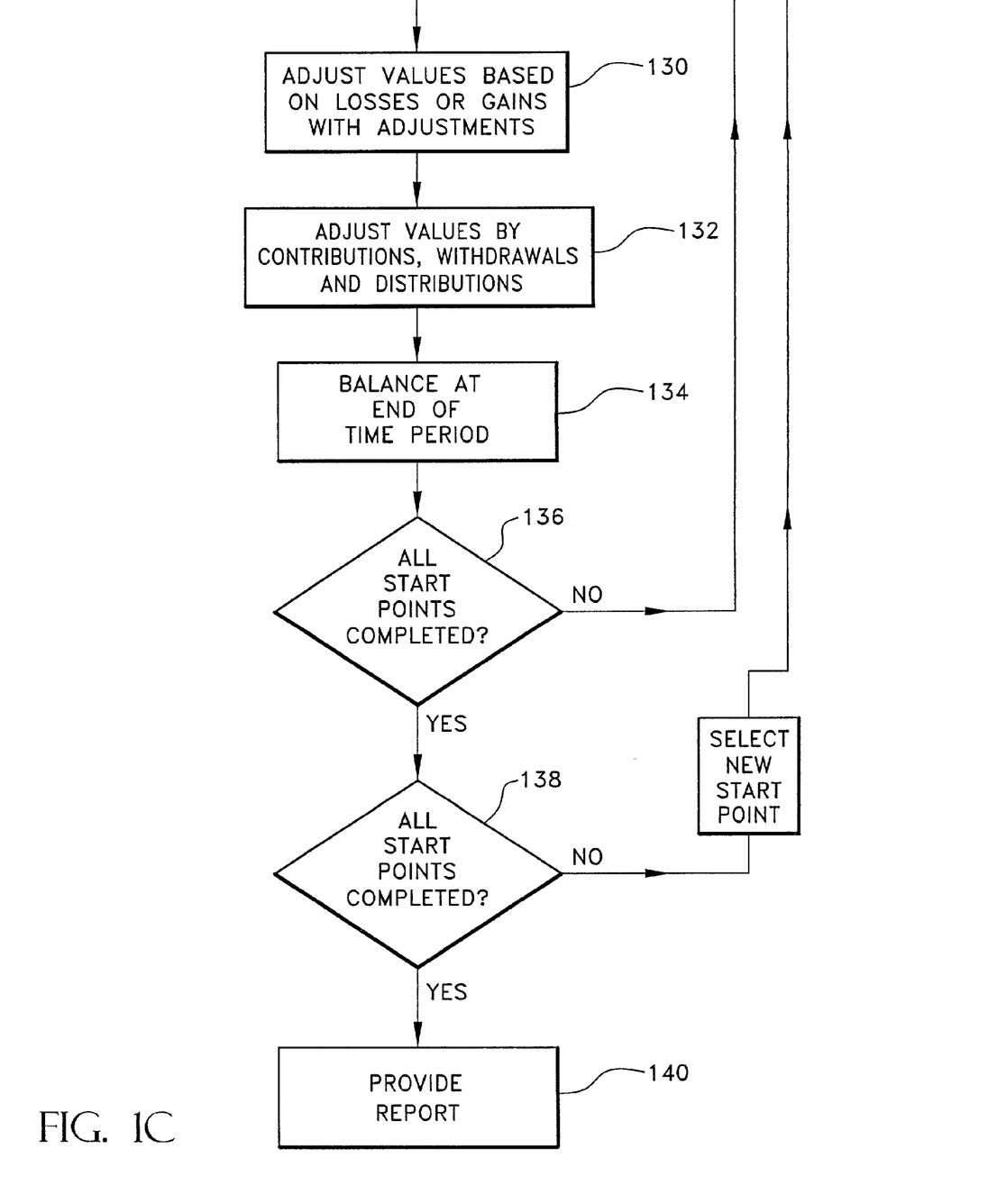

Referring to FIGS. 1A-1C, the method of the invention is illustrated in block diagram format. Generally, the initial step is to provide to a program sufficient information about the individual, the individual's current investments, planned future contributions, and planned withdrawals, to permit the method to run. At step 102, the user is prompted to define personal information. The personal information preferably includes information important to financial planning. The basic information includes the individual's birth date, the individual's intended retirement age, and the end age for the plan. The information may also include, if the individual has a spouse, the spouse's birth date, the spouse's intended retirement age, and the end age of the spouse for the plan.

The user may then be prompted to define one or more accounts, as shown at block 104. Preferably, these accounts are named by the user. The user is prompted to define the properties of each account as shown at block 106. The most important property of the account is the tax treatment of the account. For example, the gains on the account may be subject to current taxation. Alternatively, the gains on the account may be deferred until withdrawal. Pull-down menus may be provided to provide a selection from a variety of different types of investments, such as 401(k), 403(b), Individual Retirement Account, savings account, Education IRA, Roth IRA, investment real estate, and other investment types.

The user is prompted to provide opening balances of each account at block 108. For an effective financial plan, the opening balances preferably represent the actual present values of the accounts.

The user is prompted to furnish the planned annual contribution to each account, as shown at block 110. The program may provide for changes in planned annual contributions to accounts at different time periods in the future, or selection of the start and end age of contributions for various accounts. A default may be a level contribution starting immediately and continuing until retirement.

The user is prompted to provide planned retirement distributions, as shown at block 112. This may be a desired retirement income level. The user may further refine by providing specific distributions from specific sources. For example, such sources might include a defined benefit retirement plan.

In a preferred embodiment, the user is then prompted to provide information on Social Security and other sources of retirement income, as shown in block 114. The user may select a desired retirement age. The program may then display annual social security benefits based on formulas or tables accessed by the program. Such formulas or tables have been constructed from publicly-available Social Security benefit information.

The user is prompted to enter additional withdrawal information at block 116. For example, a form may be provided to input the age of each child, what levels of education for the child will be paid by the individual, and the expected cost per year. The amount and time of the expected withdrawals from investments may then readily be calculated. Other anticipated large expenses may optionally be included.

The user is then prompted to enter allocations of assets by asset categories, as shown at block 120. The asset categories are preferably large categories, such as large capitalization stocks, small capitalization stocks and foreign investments, bonds, and Treasury bills and cash. The selection of particular categories may be altered. The desired categories should be those as to which considerable historical data is available. It is preferred to assume essentially a passive investment, rather than looking at historical returns of particular managed investments. Depending on the features desired, asset allocations may be selected separately for both currently taxable and tax deferred investments. A further feature that could be added would be changes in asset allocations at different times in the future. The user may also be prompted to input expected, optimistic, and pessimistic returns on investments.

The user may also be prompted to enter a number for investment expenses. If investment expenses are given a positive percentage, this would indicate investments that underperform the market historically. If investment expenses are given a positive percentage, this would indicate investments that outperform the market historically.

The user is then prompted to enter tax information, as shown at block 122. This information preferably includes Federal income tax filing status, state of residence, and any local tax rates. The program may access tables to look up applicable Federal ordinary and capital gains income tax rates and state tax rates. Local tax rates may also optionally be entered. Tax rates may be entered from a look-up table separately for pre-retirement and retirement rates.

It will be understood that the order that the foregoing information is furnished may be changed without affecting the method. The information preferably includes as much information as possible relevant to the individual's projected cash flow into and out of investments and other retirement income.

The option of selecting an assumed inflation rate may be provided. Different inflation rates may be used with respect to different investment categories. The option may be provided of furnishing results in inflation-adjusted dollars or actual dollars.

When all the desired information has been entered, the user is prompted to run the calculation. The program has stored a series of changes in values for each separate category of assets for a selected number of time periods. The time periods may be, for example, years, months, or shorter or longer periods as desired. The performance of the plan, will then be determined assuming a large number of different starting points. Based on the input asset allocations and the current holdings values, starting values for each asset allocation and each tax status are calculated, as shown by block 124. The program selects a time period, as shown by block 125. The performance for the first selected time period is then calculated based on the historical data, separately for each asset allocation and tax status, as shown by block 126. The performance may be adjusted either before the calculation or after the calculation by the investment assumptions. For currently-taxable investments, any gain is adjusted by deducting appropriate amounts based on assumed tax rates, as shown by block 128. The gain is added to the value in each category, as shown by block 130. The contribution at the end of the time period is then added to each category, based on asset allocations and previously defined contribution amounts. Alternatively, if the year of the plan calls for a withdrawal, for retirement needs, education or otherwise, the appropriate adjustment is made to the values. This is shown by block 132. This value is stored as an ending value for the time period, as shown by block 134. The method then checks to see if the final year for the plan has been reached, as shown by decision block 136. If not, the method returns to block 125, a new time period is selected, and the calculations are repeated, using historical data from the next year in the applicable table, and the contribution, withdrawal, distribution and tax information from the next year in the plan. The method repeats until the last year of the plan is reached. When the final year of the plan is reached, the method checks to see if the total number of starting points is the final number of starting points, as shown by decision block 138. If not, then the entire method repeats, using the same opening balances as allocated, commencing from a different starting point. This is repeated until the desired number has been completed. A possible minimum number is 32 different starting points. The calculation need not be performed for consecutive years. For example, the number of years of the plan may exceed the number of years of historical data. In one embodiment, each test is run from the start point consecutively until one-half of the time period of the plan is reached, and then the calculation returns to the start point. Other methods may be used if the number of plan years exceeds the historical data.

To determine the appropriate amount to be withdrawn, Social Security and other sources may be deducted from the desired annual retirement income amount.

For purposes of comparison to a standard calculation, the program that implements the method can also calculate the returns based on a flat annual rate of return, without reference to historical data.

Figure 2:
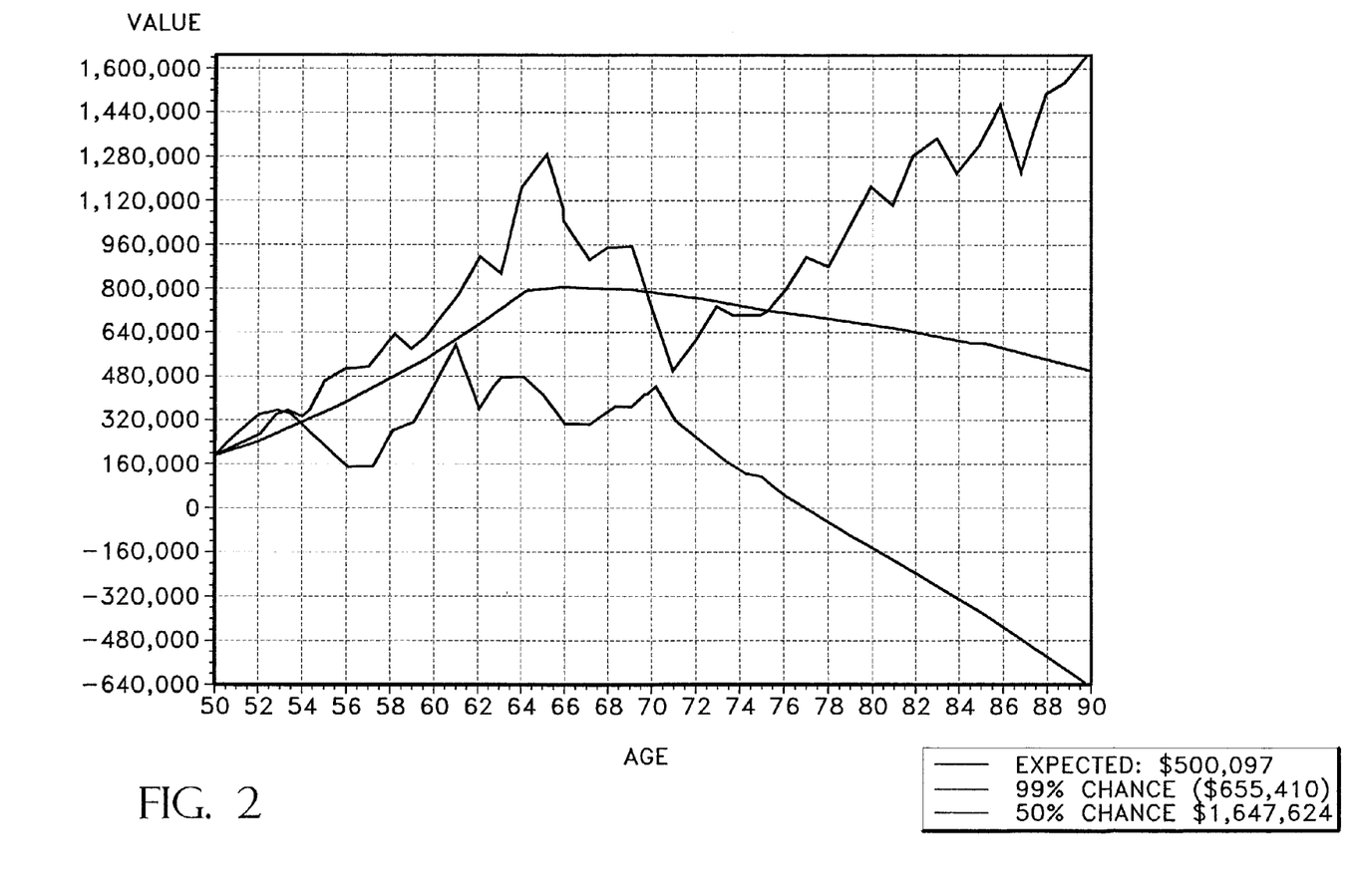
FIG. 2 is a sample graphic representation of the result of a method of the invention.

The method then provides the results in a display for the user. Preferably, only certain results are selected for display. For example, the tests may be ranked by ending value. A middle ending value, ranked at 50% probability, may be selected. An ending value representing a result better than all but one percent of the results may be selected and labeled as having a 99% probability of success. The results may be displayed in tables or graphically in a variety of formats. For example, the results may be displayed in a graph showing age against value of investments. Sample results for fictional assumptions are shown graphically at FIG. 2. Line 202 represents a standard result based on a steady annual increase in value. Line 204 represents values based on a result worse than 99% of the starting points. Line 206 represents a result that is at the midpoint of the analyses that were run.

Figure 3B:
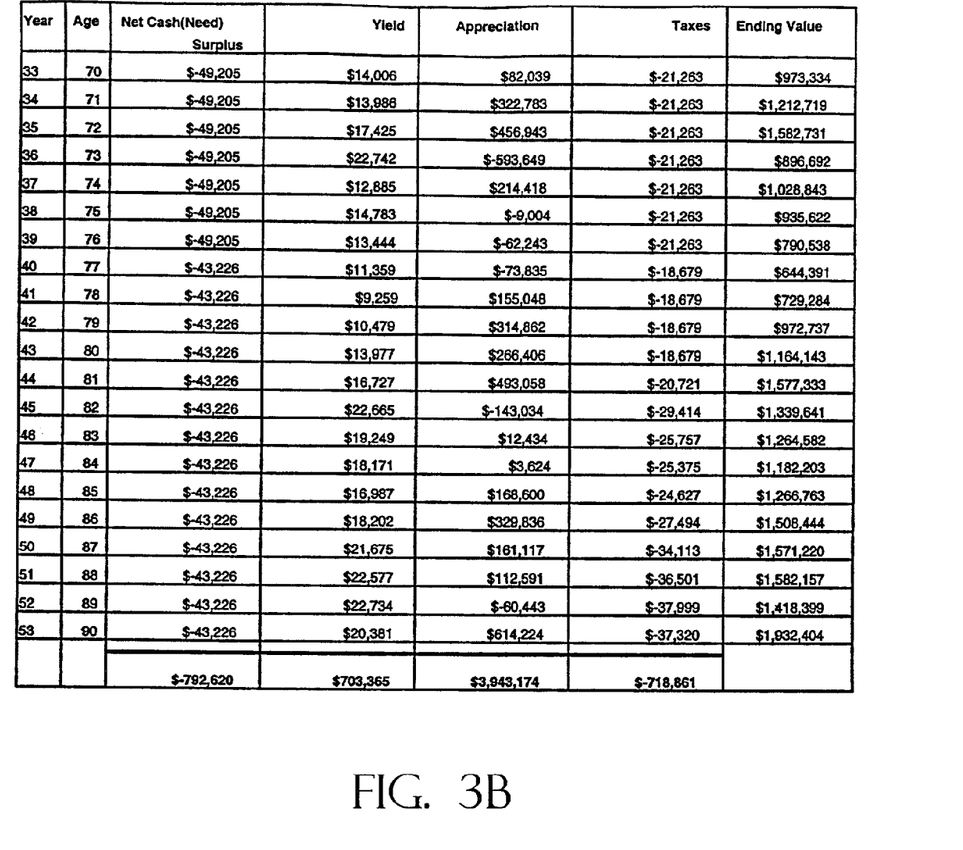

As shown in FIG. 3A and 3B, the results may also be displayed as a table. The table may show the plan year, from the date the plan is run, as shown at 302, the age of the individual at the time of the plan, as shown at 304, and the ending value, as shown at 306. Additional information, such as the cash flow into or out of investments, the yield on investments in the year, the appreciation or depreciation in value of investments, and the taxes, may also be shown a for each plan year.

The report may also include a detailed analysis listing the ending value and market periods for each test that was run. A sample is shown as FIG. 4. The tests are ranked in order from highest ending value to lowest. Column 402 displays the probability of obtaining at least the ending value listed. Column 404 displays the ending value of each test. Column 406 displays the years of the historical periods.

Other displays may include a display of cash flows into and out of investments, showing contributions to investments, withdrawals, and retirement distributions, on a year-by-year basis.

The program and system may also provide the user, together with the results of the plan, the opportunity to adjust various variables to ascertain the change in historical results. For example, an input may be provided to permit the user to change asset allocations, retirement age, contribution amounts, distribution amounts, and amounts of other withdrawals.

The program may be made accessible to users at client computers connected on the World Wide Web to a server running the program. Web-based forms may prompt the user to provide required and optional information. The results of the analysis may be displayed on the page. The results may also be presented as a report in a convenient format, such as portable document format (pdf) for downloading to the client computer, or may be e-mailed from the server to an address identified by the user at the client computer. This format is advantageous in that the tables containing historical data can readily be supplemented, and tables containing tax rate information can readily be updated. Also, a financial planner and a client can share a report on a web server with suitable security.

Figure 5:
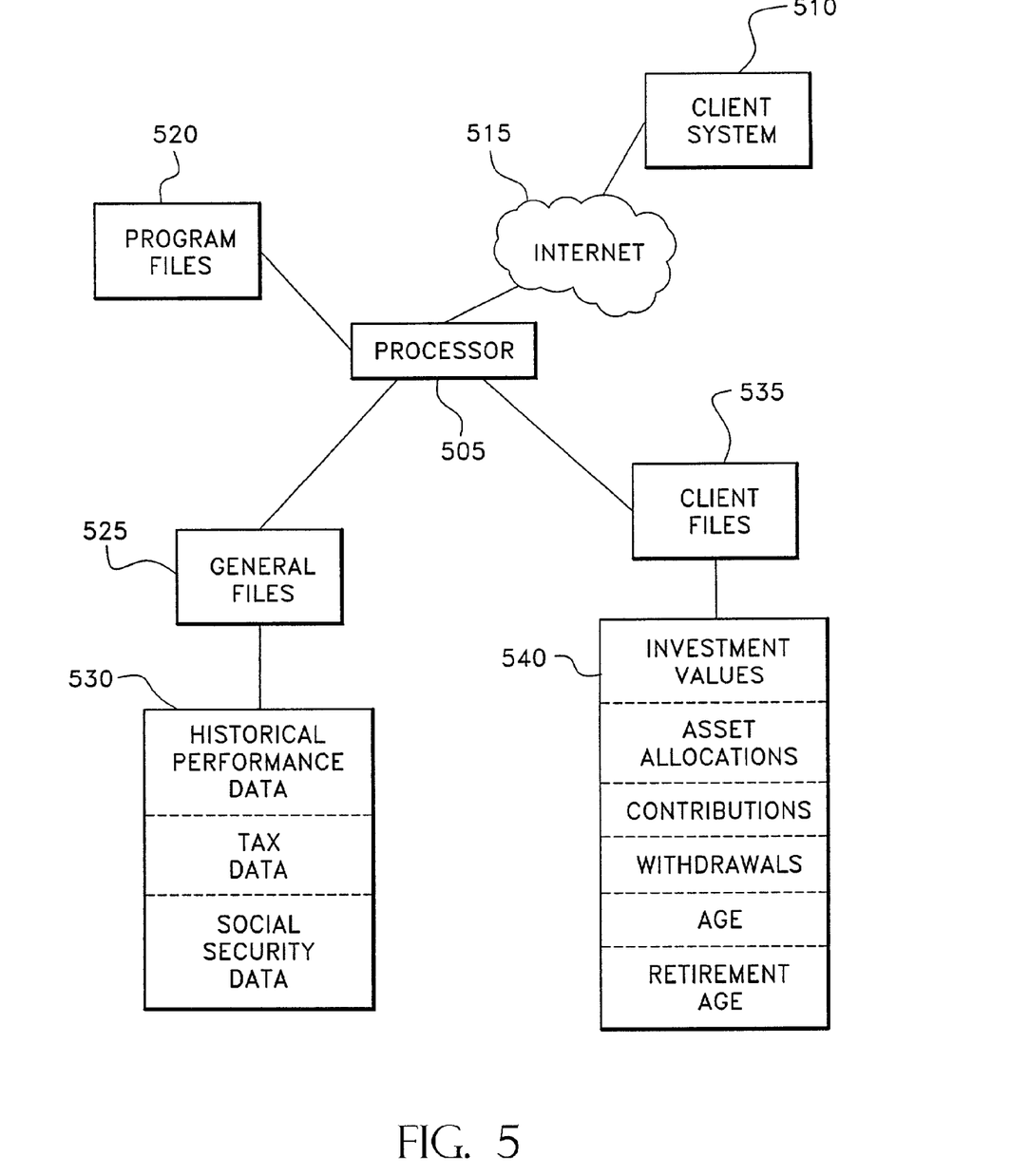
FIG. 5 is a block diagram showing features of a system according to the invention.

FIG. 5 illustrates a system according to the invention. Processor 505 is running in a server computer. Processor 505 is connected to client computer system 510 via Internet 515. As noted, the world wide web may be used for interchange of data. Processor 505 accesses program files 520 for instructions. Program files 520 are stored on a suitable storage medium, such as a hard drive, CD-ROM or other storage medium. Processor 505 accesses general files 525, which contain, non-exclusively, as shown by block 530, historical performance data, by time period, for different categories of investments, tax data, and Social Security data. Processor 505 may also access client files 535, which contain, as shown by block 540, non-exclusively, investment values, asset allocations, contributions, withdrawals, age and retirement age. Processor 505 causes the data in block 540 to be updated and changed based on data received from client system 510 in accordance with instructions contained in program files 520.

The use of the method, system and program of the invention is not limited to running on a web server. Copies of the program may be distributed on physical media or by electronic transmission.

In testing this method, the inventor has observed tremendous differences between the present invention and prior art tools, depending on the individual's pattern of contributions and withdrawals and the resulting periodic balances of their investments.

The result may be expressed as the percentage of outcomes for which the desired financial goal is actually achieved. That financial goal can be, for example, a certain amount of wealth by a certain date, or a desired stream of withdrawals. The probability of success may be expressed a percentage. The inventor believes that the analysis of a financial plan using the method of the invention will, notwithstanding the annualized rate of return, advise the individual investor as to the likelihood of achieving his objectives.

The method of the invention gives the investor the distribution the results of any financial plan based on historical market outcomes. Probabilities of obtaining certain outcomes can be derived from the distribution. Some financial plans, subjected to this analysis, will show that the investor would have run out of money before the plan indicated that. This permits the investor to know, for example, that the investor has a one-in-ten chance of failing to meet his objective. Based on this information, an investor may choose to adjust the financial plan to provide for less risk.

Unlike prior art analyses, the results of the method of the invention are is unique to the asset allocation, planned contributions and withdrawals, beginning wealth, and risk tolerances of each user. For example, for one investor, lowering the small capital stock/foreign allocation may increase the likelihood of running out of money. For another investor, increasing the small capital stock/foreign allocation may increase the likelihood of running out of money.

The software may be enhanced to include a mechanism for the investor to prioritize their financial outcomes. For example, an investor may have a goal of having a certain probability of having $10 million at age 85. The investor may prefer to retire at 65, but would be willing to retire as late as 70. The same investor may be able to save up to $40,000 per year, but may strongly prefer not to save more than $20,000 per year. By weighting the variables, the investor can then have the program run a series of scenarios. This will then provide the investor with a number of different options that meet the criteria.

Another extension of this method is, instead of splitting the length of the plan to repeat historical periods, taking actual historical returns and randomly selecting from those actual results to create a large universe of randomly ordered historical returns. This would solve the problem of sampling period due to the amount of historical data that is available. For example, a database of historical data may contain data covering 70 years. Under historical audit methodology, the method of the invention may be used to run 30 back tests for a 40 year plan. Splitting the plan period into two 20 year period and re-running each half of a plan over identical market periods would create 60 back tests. Of course, one could run each half of the plan over all the periods which would create a multiplicative effect where each half of a plan is run from the 50 potential 20 year periods (rolling monthly or quarterly data could also be used if available to expand the number of samples as well) creating 50 market periods combined with each half plan 50 times, for 2500 samples.

By using a modified Monte Carlo or wealth simulator method, one may create a randomly ordered universe of actual historical returns that simulates having 100, 1000, 10,000 etc. years worth of market data. The actual historical returns are randomly selected to simulate having much more historical data. In this way, one could use the rolling period methodology of running through rolling periods, or, since one could create such a large universe of randomly ordered actual market returns, that each period is totally unique.

Figure 6A:
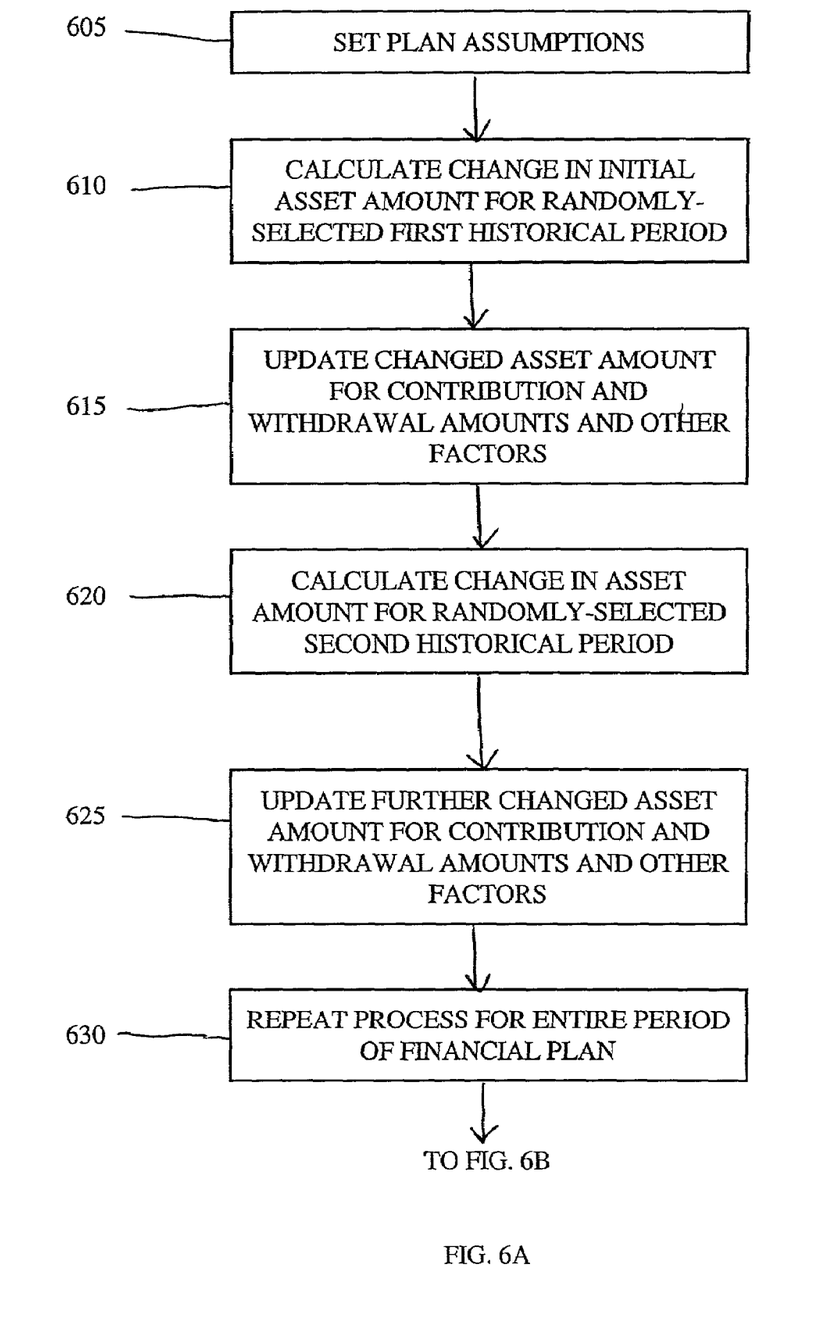
FIGS. 6A and 6B are a flow diagram showing a method according to the invention.
Figure 6B:
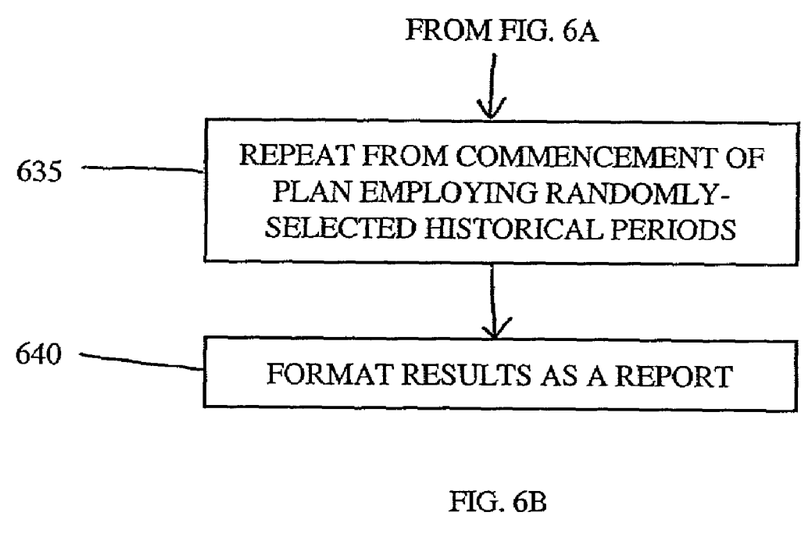

Referring to FIG. 6A-6B, there is shown a process flow diagram for a computer program according to the invention using the method of a modified Monte Carlo for increasing the possible historical returns. As indicated by step 605, the plan assumptions are set. These assumptions indicate the selection of the initial asset amount, allocation of assets among various types of securities and types of accounts, tax information, and other information. The change in the initial asset amount is then calculated for a randomly-selected first historical period, as indicated by block 610. The length of the historical period may be a year, or other period. As indicated by block 615, any changes in amounts as a result of predetermined contributions or withdrawals, as well as other factors, such as tax effects, are made. These changes result in obtaining a further changed asset amount. The further changed asset amount is then adjusted by the historical performance of a second randomly selected historical period, as indicated by block 620. This second randomly selected historical period is preferably selected independently of the selection of the first historical period. An asset amount is then obtained from the result of this calculation. The asset amount is adjusted for contribution amounts, withdrawal amounts, and any other appropriate factors, as indicated by block 625. The process is repeated, using randomly-selected historical periods, through the entire period of the financial plan, as indicated by block 630. The final value, the interim values, and the historical periods selected, are stored in a suitable location in a storage medium. The process is then repeated, commencing with the initial investment amount, using a new set of randomly-selected historical periods, as indicated by block 635. The process may be repeated for a very large number of iterations, as a very large number of different orders of randomly-selected historical periods may be obtained even for a relatively small number, such as 50 to 70, historical periods. The results may be presented as a report to a financial planner or individual, as indicated by block 640. Various tools may be employed to format the results. Analyses may be conducted on the results and included in the report. For example, tools may be provided to create and include in the report comparisons of results using different randomly-selected sets of historical periods to financial goals of the investor. These financial goals may include having a certain amount of money at the end of the financial plan, being able to make withdrawals at certain amounts in the future, and other goals.

It will be appreciated that the term "randomly" for the selection of historical periods may use any suitable technique for randomly, or pseudo-randomly, selecting individual items from a set of items, and need not be strictly random. The selection may take place during processing, or may be accomplished before analysis, stored in a suitable file, and accessed at the time of calculation.

Information for all these methods could also be displayed to the user as the percentage of market periods (whether randomly ordered with or without rolling periods, historical back test, or historical back test with splits) as the percentage of periods that exceeded a wealth target goal, the percentage of tests that the investor would have run out of money (including the age the investor would have run out of money) and the percentage of the tests falling short of the target wealth goal but not having failed. All of these methods could also be combined with the probability of the investor living the length of the plan or out living the length of the plan, thereby further increasing the sampling by running the length of plan instead of a target age, but instead setting the plan length based on the sampling distribution on numerous plan lengths based on the probability distribution of how long the investor, their spouse, or their combined lifetimes would be.

The method of the invention may be used dynamically by investors for guidance in making investment and purchase decisions. For example, an investor may find that, by foregoing a purchase, he may retire earlier, or increase his likelihood of achieving his savings goal at retirement, by not making the contemplated purchase. An investor contemplating an investment may find that, depending on the category of investment, she may either increase or decrease her likelihood of achieving her financial goals.

The planning software of the invention, including the historical data on which the calculations are based, can be made available to the investor to update based on the actual current data on the value of investments. Data could be transferred automatically from financial services providers to client files on a server so that the updates could be accomplished without requiring the data to be input by the investor.

The processor may be an Intel Pentium or similar microprocessor. The method can be implemented in custom software, or in spreadsheet software such as Excel. The computer program with commands that cause a computer to execute the method can be stored on any storage medium that now exists or may be developed in the future, including fixed disk drive, floppy discs, and CD-ROM. The computer program may also be transmitted as a digital signal over telephone lines, other transmission lines, or via radio waves. The signal may be transmitted in packets over a packet-switched network, such as the Internet.

The computer program in accordance with the invention may be stored and distributed in any suitable storage medium, such as fixed disk, portable diskettes, and CD-ROM or other read-only memories. Also, methods described as being carried out in software running on general-purpose computer hardware may be implemented in hardware.

It will be understood that various changes in the details, materials and arrangements of the methods and systems which have been described and illustrated above in order to explain the nature of this invention may be made by those skilled in the art without departing from the principle and spirit of the invention.

What is claimed is:

1. A method for evaluating a financial plan including predetermined initial values of investments and one or more contribution or withdrawal amounts corresponding to selected times after the commencement of the financial plan, the method being implemented by a computer, the method comprising the steps of:

calculating, by the computer, the change in a predetermined initial value of an investment over a time interval based on changes in value over a randomly-selected first historical time interval to obtain a changed investment value;

updating, by the computer, the changed investment value based on one or more contribution or withdrawal amounts corresponding to the length of the time interval in accordance with the financial plan to obtain a further changed investment value;

calculating, by the computer, the change in the further changed investment value over a second time interval based on changes over a second historical time interval, said second historical time interval being randomly-selected independent of said first historical time interval, to obtain a second changed investment value;

updating, by the computer, the second changed investment value based on a selected contribution or withdrawal amount corresponding to the length of the second time interval in accordance with the financial plan; and repeating, by the computer, said steps of calculating and updating with respect to a third historical time interval and a fourth historical time interval, respectively, said third historical time interval and said fourth historical time interval being selected randomly.

2. The method of claim 1, further comprising the step of presenting, by the computer, the result of said steps to an individual.

3. The method of claim 1, wherein said investments are categorized in more than one asset category, and distinct historical data is employed in calculations for each of said asset categories.

4. The method of claim 1, further comprising the step of comparing, by the computer, the results of said calculation to a selected financial goal.

5. The method of claim 1, wherein, after each calculation relative to historical data, an adjustment of the investment value to simulate tax effects is made.

6. The method of claim 1, further comprising the step of prompting, by the computer, a user to enter the initial investment value, and allocations to asset categories.

7. The method of claim 1, wherein the steps of calculating and updating are repeated for a plurality of randomly-selected historical intervals until a total of the randomly-selected historical intervals equals a total financial plan period.

8. The method of claim 1, further comprising the step of updating, by the computer, the changed investment value based on one or more withdrawal amounts corresponding to an anticipated large expense.

9. A system for evaluating financial plans including predetermined initial values of investments and one or more contribution or withdrawal amounts corresponding to selected times after the commencement of the financial plans, the system comprising:

a processor configured for calculating the change in a predetermined initial value of an investment over a time interval based on changes in value over a randomly-selected first historical time interval to obtain a changed investment value;

the processor further configured for updating the changed investment value in accordance with one or more contribution or withdrawal amounts corresponding to the length of the time interval in accordance with the financial plan to obtain a further changed investment value;

the processor further configured for calculating the change in the further changed investment value over a second time interval based on changes over a randomly-selected second historical time interval to obtain a second changed investment value;

the processor further configured for updating the second changed investment value in accordance with contribution or withdrawal amounts corresponding to the length of the second time interval in accordance with the financial plan; and the processor further configured for further calculating and updating with respect to a third historical time interval and a fourth historical time interval, respectively, said third historical time interval and said fourth historical time interval being selected randomly.

10. The system of claim 9, wherein the processor is further configured for presenting the result of said steps to an individual.

11. The system of claim 9, wherein the processor is further configured for categorizing said investments in more than one asset category, and for employing distinct historical data in calculations for each of said asset categories.

12. The system of claim 9, wherein the processor is further configured for comparing the results of said calculation to a selected financial goal.

13. The system of claim 9, wherein the processor is further configured for, after each calculation relative to historical data, adjusting the investment value to simulate tax effects.

14. The system of claim 9, wherein the processor is further configured for prompting a user to enter the initial investment value, and allocations to asset categories.

15. The system of claim 9, wherein the processor is further configured for updating the changed investment value based on one or more withdrawal amounts corresponding to an anticipated large expense.

16. The system of claim 9, wherein the processor is further configured for repeatedly calculating and updating for a plurality of randomly-selected historical intervals until a total of the randomly-selected historical intervals equals a total financial plan period.

17. A storage medium having stored therein a plurality of instructions, wherein the plurality of instructions, when executed by a processor, cause the processor to perform the steps of:

calculating the change in a predetermined initial value of an investment over a time interval based on changes in value over a randomly-selected first historical time interval to obtain a changed investment value;

updating the changed investment value based on one or more contribution or withdrawal amounts corresponding to the length of the time interval in accordance with the financial plan to obtain a further changed investment value;

calculating the change in the further changed investment value over a second time interval based on changes over a randomly-selected second historical time interval to obtain a second changed investment value; and repeating said steps of calculating and updating with respect to a randomly-selected third historical time interval and a randomly-selected fourth historical time interval, respectively.

18. The storage medium of claim 17, wherein the plurality of instructions, when executed by a processor, cause the processor to perform the further step of presenting the result of said steps to an individual.

19. The storage medium of claim 17, wherein the plurality of instructions, when executed by a processor, cause the processor to perform the further step of, for investments categorized in more than one asset category, employing distinct historical data is employed in calculations for each of said asset categories.

20. The storage medium of claim 17, wherein the plurality of instructions, when executed by a processor, cause the processor to perform the further step of comparing the results of said calculation to a selected financial goal.

21. The storage medium of claim 17, wherein the plurality of instructions, when executed by a processor, cause the processor to perform the further step of, after each calculation relative to historical data, adjusting the investment value to simulate tax effects.

22. The storage medium of claim 17, wherein the plurality of instructions, when executed by a processor, cause the processor to perform the further step of prompting a user to enter the initial investment value, and allocations to asset categories.

23. The storage medium of claim 17, wherein the plurality of instructions, when executed by a processor, cause the processor to perform the further step of updating the changed investment value based on one or more withdrawal amounts corresponding to an anticipated large expense.

24. The storage medium of claim 17, wherein the plurality of instructions, when executed by a processor, cause the processor to repeat said steps of calculating and updating with respect to a randomly-selected third historical time interval and a randomly-selected fourth historical time interval, respectively.

25. A method for calculating a change in a predetermined initial value of an investment over a plan time interval, the method being implemented by a computer, the method comprising the steps of:

calculating, by the computer, a change in the predetermined initial value over a randomly-selected first historical time interval to obtain a first interim changed investment value;

calculating, by the computer, a change in the first interim changed investment value over a randomly-selected second historical time interval to obtain a second interim changed investment value;

repeating, by the computer, the second calculating step with respect to a plurality of randomly-selected historical time intervals until a sum of all of the historical time intervals equals the plan time interval; and presenting the result of the last repeated calculating step to an individual.

26. The method of claim 25, wherein the change in the initial value is calculated in part based on one or more predefined contributions or withdrawals occurring during the portion of the plan interval corresponding to the first historical time interval, and wherein the change in each interim changed investment value is calculated in part based on one or more predefined contributions or withdrawals occurring during the portion of the plan interval corresponding to each respective historical time interval.

* * * * *